(12) United States Patent
Pfaeffle et al.

(10) Patent No.: US 7,337,658 B2
(45) Date of Patent: Mar. 4, 2008

(54) METHOD FOR OPERATING AN INTERNAL COMBUSTION ENGINE

(75) Inventors: Andreas Pfaeffle, Wuestenrot (DE); Wolfgang Klenk, Loechgau (DE); Stefan Scherer, Suttgart (DE); Simone Neuberth, Walzbachtal (DE); Albrecht Schwaderer, Untergruppenbach (DE)

(73) Assignee: Robert Bosch GmbH, Stuttgart (DE)

( * ) Notice: Subject to any disclaimer, the term of this patent is extended or adjusted under 35 U.S.C. 154(b) by 14 days.

(21) Appl. No.: 10/555,127

(22) PCT Filed: Apr. 6, 2004

(86) PCT No.: PCT/EP2004/050451

§ 371 (c)(1), (2), (4) Date: Sep. 7, 2006

(87) PCT Pub. No.: WO2004/097193

PCT Pub. Date: Nov. 11, 2004

(65) Prior Publication Data

US 2007/0163231 A1 Jul. 19, 2007

(30) Foreign Application Priority Data

Apr. 29, 2003 (DE) ............... 103 19 224

(51) Int. Cl.
*G01M 15/00* (2006.01)
(52) U.S. Cl. .................................. 73/118.1
(58) Field of Classification Search ......... 73/23.31, 73/23.32, 116, 117.2, 117.3, 118.1
See application file for complete search history.

(56) References Cited

U.S. PATENT DOCUMENTS

| 6,629,453 | B1* | 10/2003 | Surnilla et al. ............ 73/118.1 |
| 6,694,243 | B2* | 2/2004 | Shi et al. ..................... 701/114 |
| 6,868,666 | B2* | 3/2005 | Frank et al. .................. 60/277 |
| 2001/0054282 | A1* | 12/2001 | Lang et al. .................... 60/277 |
| 2002/0120386 | A1* | 8/2002 | Shi et al. ..................... 701/114 |
| 2002/0121083 | A1* | 9/2002 | Lindner et al. ............... 60/277 |
| 2002/0144501 | A1 | 10/2002 | Kitamura et al. |
| 2003/0023368 | A1* | 1/2003 | Meyer et al. ............... 701/114 |
| 2003/0061860 | A1* | 4/2003 | Hu et al. .................... 73/23.31 |
| 2006/0032214 | A1* | 2/2006 | Li et al. ....................... 60/285 |

* cited by examiner

*Primary Examiner*—Eric S. McCall
(74) *Attorney, Agent, or Firm*—Kenyon & Kenyon LLP

(57) ABSTRACT

A method is described for operating an internal combustion engine, in particular of a motor vehicle. In the method, a lean air/fuel mixture is burned in a combustion chamber; nitrogen oxides contained in the exhaust gas are stored in an accumulator-type catalytic converter; a storage efficiency, with which the accumulator-type catalytic converter stores the nitrogen oxides contained in the exhaust gas, is ascertained; and the storage efficiency is ascertained as a function of an instantaneous space velocity of the exhaust gases in the accumulator-type catalytic converter. Two efficiencies are ascertained at least as a function of the temperature of the accumulator-type catalytic converter and a space velocity. One of the two efficiencies is ascertained for a great space velocity, and the other efficiency is ascertained for a small space velocity. The storage efficiency is ascertained as a function of the instantaneous space velocity from the two efficiencies.

9 Claims, 4 Drawing Sheets

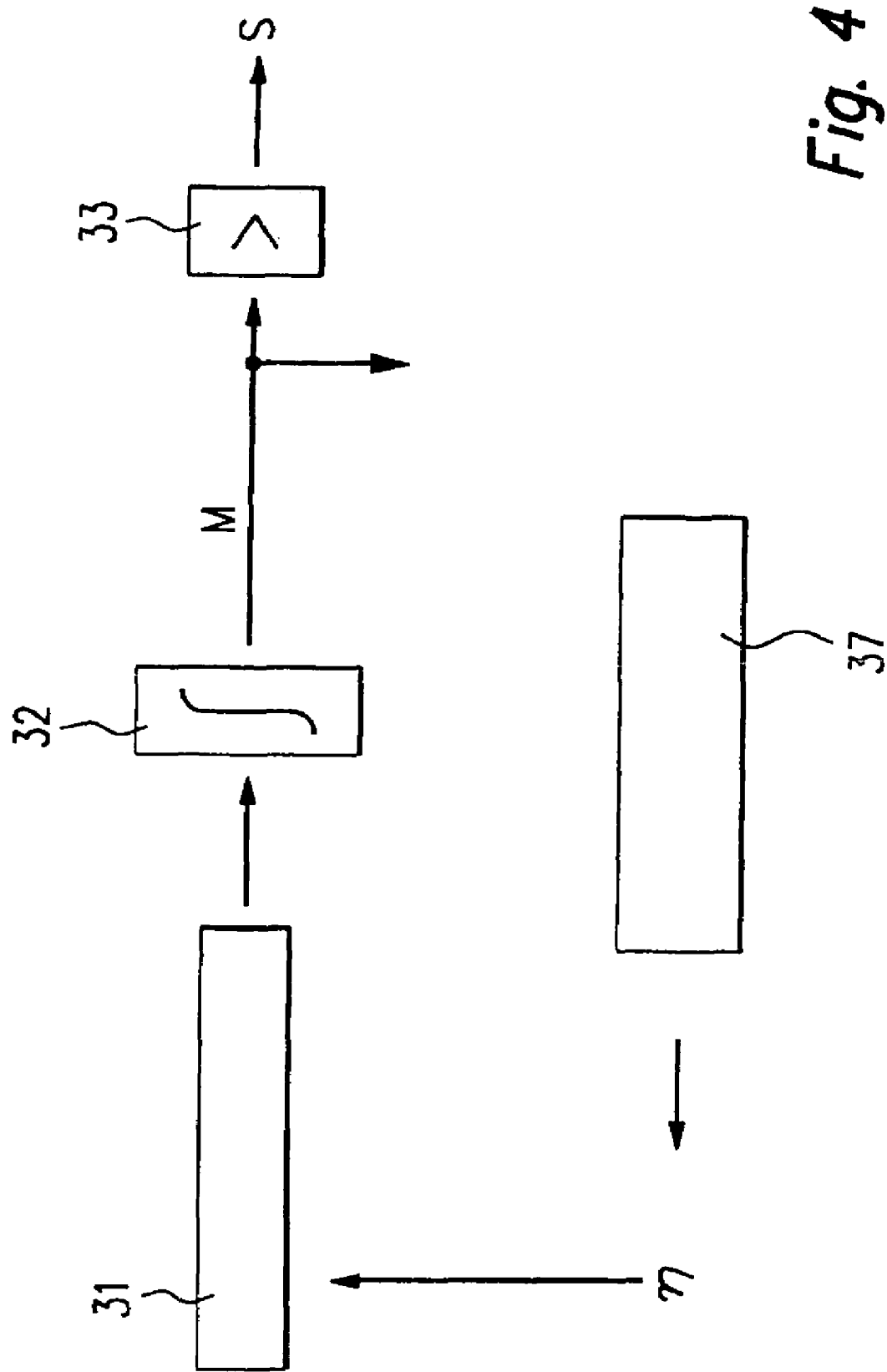

METHOD FOR OPERATING AN INTERNAL COMBUSTION ENGINE

FIELD OF THE INVENTION

The present invention is based on a method for operating an internal combustion engine, particularly of a motor vehicle, in which a lean air/fuel mixture is burned in a combustion chamber; in which nitrogen oxides contained in the exhaust gas are stored in an accumulator-type catalytic converter; in which a storage efficiency, with which the accumulator-type catalytic converter stores the nitrogen oxides contained in the exhaust gas, is ascertained; and in which the storage efficiency is ascertained as a function of an instantaneous space velocity of the exhaust gases in the accumulator-type catalytic converter. The present invention also relates to a computer program, a control device and an internal combustion engine of the corresponding type.

BACKGROUND INFORMATION

Such a method is known from German Patent No. 199 26 305. There, an internal combustion engine is operated with a lean fuel/air mixture, which means nitrogen oxides are stored temporarily in an accumulator-type catalytic converter. In a regeneration phase, the internal combustion engine is operated with a rich fuel/air mixture, which means the stored nitrogen oxides are catalytically converted.

During the storage of nitrogen oxides, a storage efficiency is calculated, with which the accumulator-type catalytic converter stores nitrogen oxides contained in the exhaust gas of the internal combustion engine. This storage efficiency is dependent, inter alia, on an air-mass flow which, however, only represents a substitute for the space velocity of the exhaust gas in the accumulator-type catalytic converter. In column 3, lines 47 through 49 of German Patent No. 199 26 305, it is assumed that this substitution can be made, since the catalytic converter volume is constant.

However, ascertainment of the storage efficiency according to German Patent No. 199 26 305 has proven to be inaccurate.

SUMMARY OF THE INVENTION

An object of the present invention is to provide a method which supplies the most optimal storage efficiency possible, without greater expenditure. This objective is achieved according to the present invention in a method of the type indicated at the outset, in that two efficiencies are ascertained at least as a function of the temperature of the accumulator-type catalytic converter and a space velocity; one of the two efficiencies is ascertained for a great space velocity and the other efficiency is ascertained for a small space velocity; and the storage efficiency is ascertained as a function of the instantaneous space velocity from the two efficiencies.

Thus, according to the present invention, the instantaneous space velocity of the exhaust gas in the accumulator-type catalytic converter is taken into account. Therefore, there is no replacement by other variables. This measure alone substantially improves the precision of the method according to the present invention compared to the related art.

At the same time, however, it is not necessary that corresponding efficiencies be available for all possible instantaneous space velocities. Instead, this is only necessary for two space velocities, based on which the storage efficiency is then ascertained. It is thereby ensured that the method of the present invention entails only a small expenditure, accompanied by nevertheless optimal results.

In one advantageous further development of the invention, the two efficiencies are ascertained as a function of the $NO_x$ mass already stored in the accumulator-type catalytic converter. It is thereby possible, in addition to the temperature of the accumulator-type catalytic converter, to also take into account the aforementioned $NO_x$ mass already stored when determining the storage efficiency. In this manner, the accuracy of the ascertained storage efficiency is further optimized.

It is particularly useful if the two efficiencies are interpolated. It is thereby possible, in simple manner, to achieve optimal linkage of the two efficiencies.

In one advantageous embodiment of the invention, the two efficiencies for the two space velocities are measured in advance on a reference accumulator-type catalytic converter of the same type. The efficiencies may then advantageously be stored in the form of two characteristics maps.

In another advantageous development of the invention, the storage efficiency is influenced by further factors, e.g., by the storage of sulphur oxides in the accumulator-type catalytic converter and/or by the ageing of the accumulator-type catalytic converter over time. The accuracy of the storage efficiency may thereby be further increased.

Further features, uses and advantages of the present invention come to light from the following description of exemplary embodiments of the invention which are shown in the figures of the drawing. In this context, all described or depicted features, alone or in any desired combination, form the subject matter of the present invention, and irrespective of their wording or illustration in the description and in the drawing, respectively.

BRIEF DESCRIPTION OF DRAWINGS

FIG. 4 shows a schematic flow chart of an exemplary embodiment of a supplementation of the method of FIG. 3.

DETAILED DESCRIPTION

Figure 1:
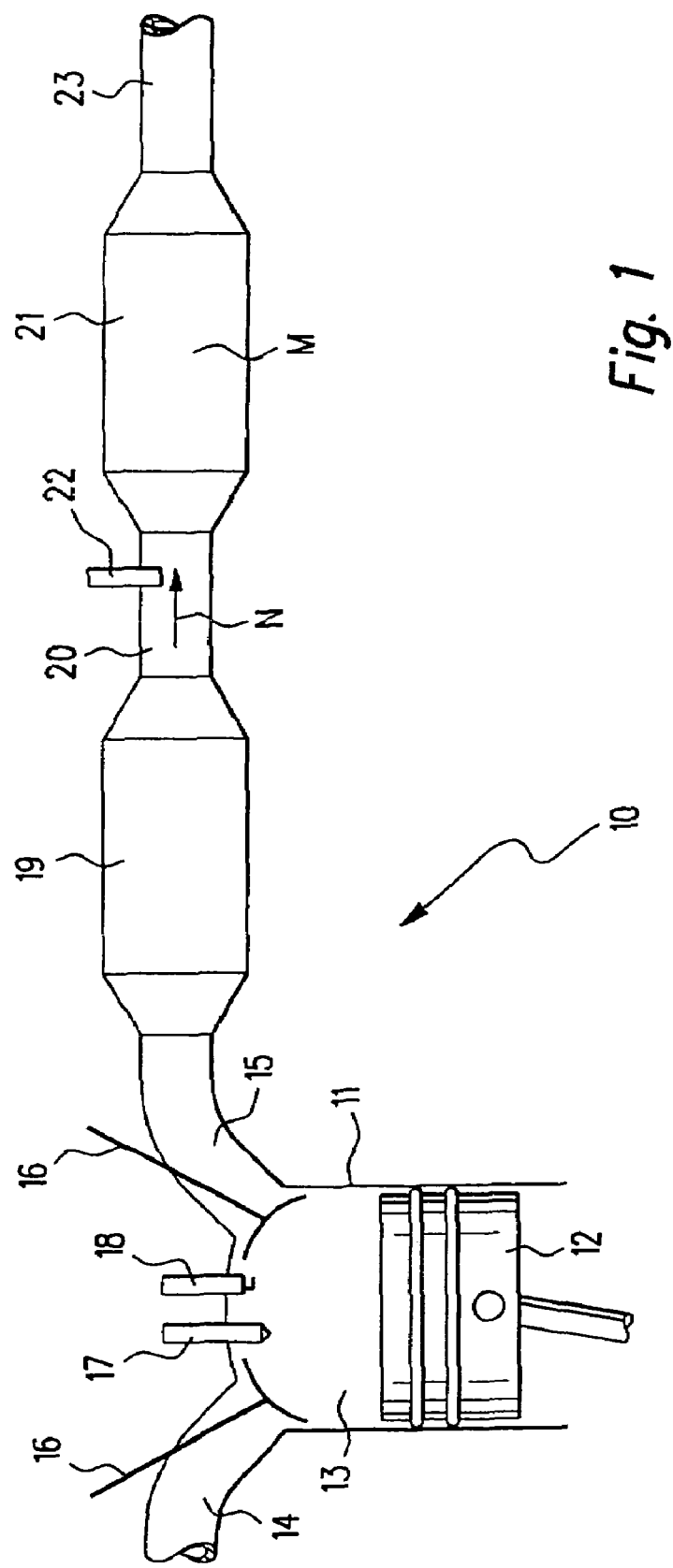
FIG. 1 shows a schematic representation of an exemplary embodiment of an internal combustion engine according to the present invention.

FIG. 1 shows an internal combustion engine 10, which is provided in particular for use in a motor vehicle. Internal combustion engine 10 is a gasoline internal combustion engine having direct injection. However, the invention described in the following may also be used in corresponding manner for a diesel combustion engine or for an internal combustion engine having manifold injection.

Internal combustion engine 10 has a cylinder 11 in which a piston 12 is movable back and forth. Cylinder 11 and piston 12 delimit a combustion chamber 13. Connected to combustion chamber 13 is an intake manifold 14, via which air may be conveyed to combustion chamber 13. Also connected to combustion chamber 13 is an exhaust pipe 15 via which exhaust gas is able to be discharged from combustion chamber 13. Valves 16 are provided to control the air supply and the exhaust flow. Furthermore, a fuel injector 17 and a spark plug 18 are assigned to combustion chamber 13. Fuel may be injected into combustion chamber 13 via fuel injector 17, and the injected fuel in combustion chamber 13 is able to be ignited with the aid of spark plug 18 and thus combusted.

Connected to exhaust pipe 15 is a three-way catalytic converter 19 which is provided to convert the pollutant components HC, CO and $NO_x$, into the components $H_2O$, $CO_2$ and $N_2$. Three-way catalytic converter 19 is not absolutely necessary for a diesel engine. The three-way catalytic converter is connected to an accumulator-type catalytic converter 21 via a pipe 20. In pipe 20, a temperature sensor 22 may be provided which ascertains the temperature of the exhaust gas flowing into accumulator-type catalytic converter 21. Alternatively, temperature sensor 22 may also be assigned to accumulator-type catalytic converter 21 or to another location in the exhaust branch, in order to measure or ascertain the temperature of the exhaust gas directly and/or with the aid of a modeling. A further pipe 23 is connected to accumulator-type catalytic converter 21.

If internal combustion engine 10 is operated with a stochiometric air/fuel mixture, thus where Lambda=1, then the pollutant components formed in this case are converted by three-way catalytic converter 19. However, to save on fuel, internal combustion engine 10 is also operated with a lean air/fuel mixture, thus where Lambda>1. The result is that, because of the excess air, the nitrogen oxides $NO_x$ contained in the exhaust gas can no longer be reduced in three-way catalytic converter 19.

For this purpose, accumulator-type catalytic converter 21 is provided, which is capable of storing the nitrogen oxides $NO_x$ temporarily. The storage capacity of accumulator-type catalytic converter 21 is limited. Thus, the storage capability decreases as the filling ratio of accumulator-type catalytic converter 21 increases. Moreover, the storage-capability limit is a function of performance quantities of internal combustion engine 10. Accumulator-type catalytic converter 21 must always be discharged again and regenerated. To that end, internal combustion engine 10 is operated for a short period with a rich air/fuel mixture, thus where Lambda<1. The nitrogen oxides $NO_x$ stored in accumulator-type catalytic converter 21 are thereby converted into the components $N_2$ and $CO_2$. After such a regeneration of accumulator-type catalytic converter 21, it is again able to temporarily store nitrogen oxides $NO_x$.

The point of time for regenerating accumulator-type catalytic converter 21 may be determined, for example, with the aid of an $NO_x$ sensor downstream of accumulator-type catalytic converter 21. Often, however, it is also necessary to control the regeneration of accumulator-type catalytic converter 21 without the aforesaid $NO_x$ sensor. The method of the present invention described below may be used for that purpose.

Figure 2A:
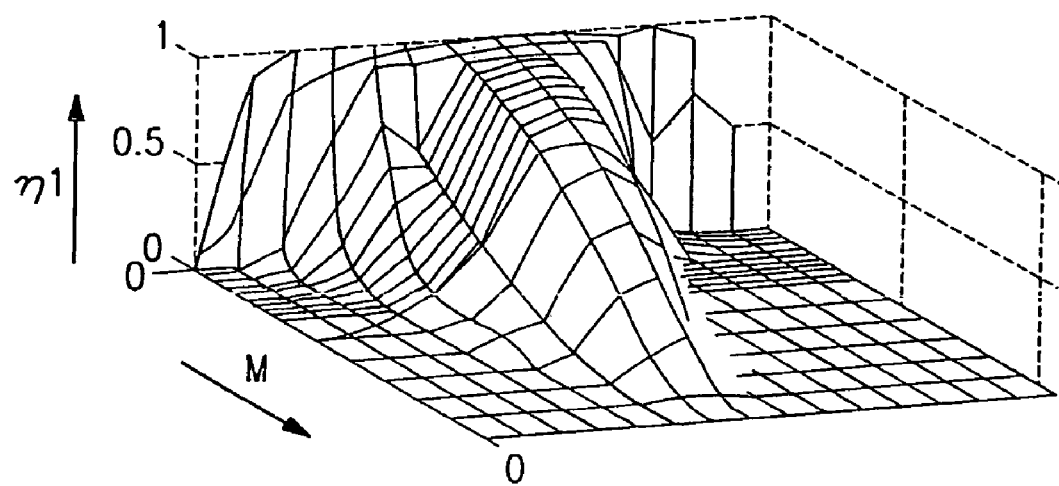
FIGS. 2a and 2b show two schematic, three-dimensional characteristics maps of performance quantities of the internal combustion engine in FIG. 1.
Figure 2B:
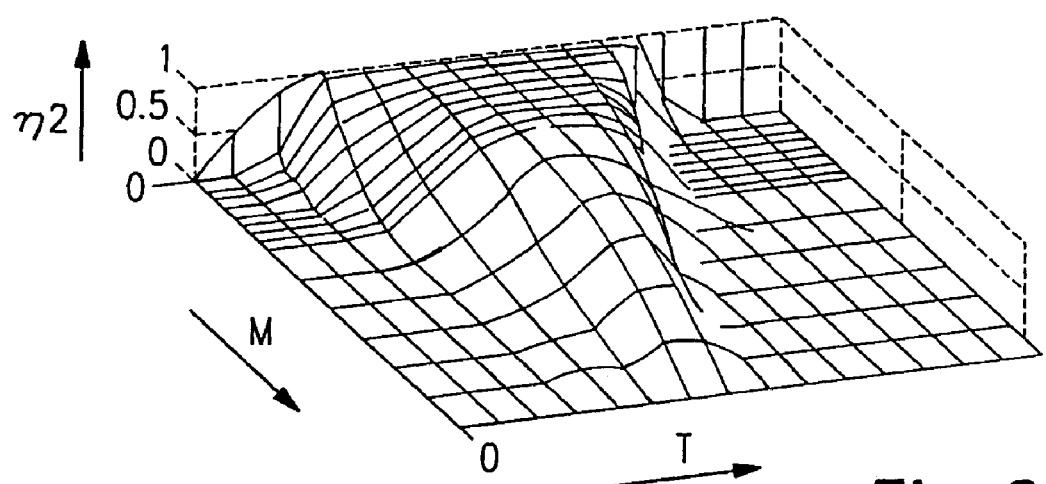

FIGS. 2a and 2b show two characteristics maps having state variables of accumulator-type catalytic converter 21, which in each case are spanned over three axes. In both characteristics maps, they are a temperature T of accumulator-type catalytic converter 21, an $NO_x$ mass M already stored in accumulator-type catalytic converter 21 and an efficiency $\eta 1$ and $\eta 2$, respectively. The characteristics map of FIG. 2a relates to a first space velocity R1 of the exhaust gas in accumulator-type catalytic converter 21, and the characteristics map of FIG. 2b relates to a second such space velocity R2. Because of the different space velocities R1, R2, different characteristics maps also result in FIGS. 2a and 2b, and therefore, in particular, different efficiencies $\eta 1$ and $\eta 2$, respectively.

For example, from the characteristics map in FIG. 2a, it is apparent that efficiency $\eta 1$ is essentially a function of temperature T of accumulator-type catalytic converter 21 and the $NO_x$ mass M already stored. Thus, in general, the smaller the $NO_x$ mass M already stored in accumulator-type catalytic converter 21, the greater efficiency $\eta 1$ becomes. Moreover, efficiency $\eta 1$ generally becomes smaller when temperature T of accumulator-type catalytic converter 21 assumes values that are rather smaller or rather greater.

Space velocity R1 of the exhaust gas in accumulator-type catalytic converter 21 is greater in the characteristics map of FIG. 2a than space velocity R2 in the characteristics map of FIG. 2b. In particular, space velocity R1 in the characteristics map of FIG. 2a represents a maximum value, and space velocity R2 in the characteristics map of FIG. 2b represents a minimum value. From a comparison of the two characteristics maps in FIGS. 2a and 2b, it is apparent that—given otherwise equal conditions—efficiency $\eta 1$ of the characteristics map in FIG. 2a is generally greater than efficiency $\eta 2$ of the characteristics map in FIG. 2b.

The two characteristics maps of FIGS. 2a and 2b are measured in advance at a reference accumulator-type catalytic converter and the resulting values are stored in any manner. Accumulator-type catalytic converter 21 used in FIG. 1 is of the same type as the measured reference accumulator-type catalytic converter.

Figure 3:
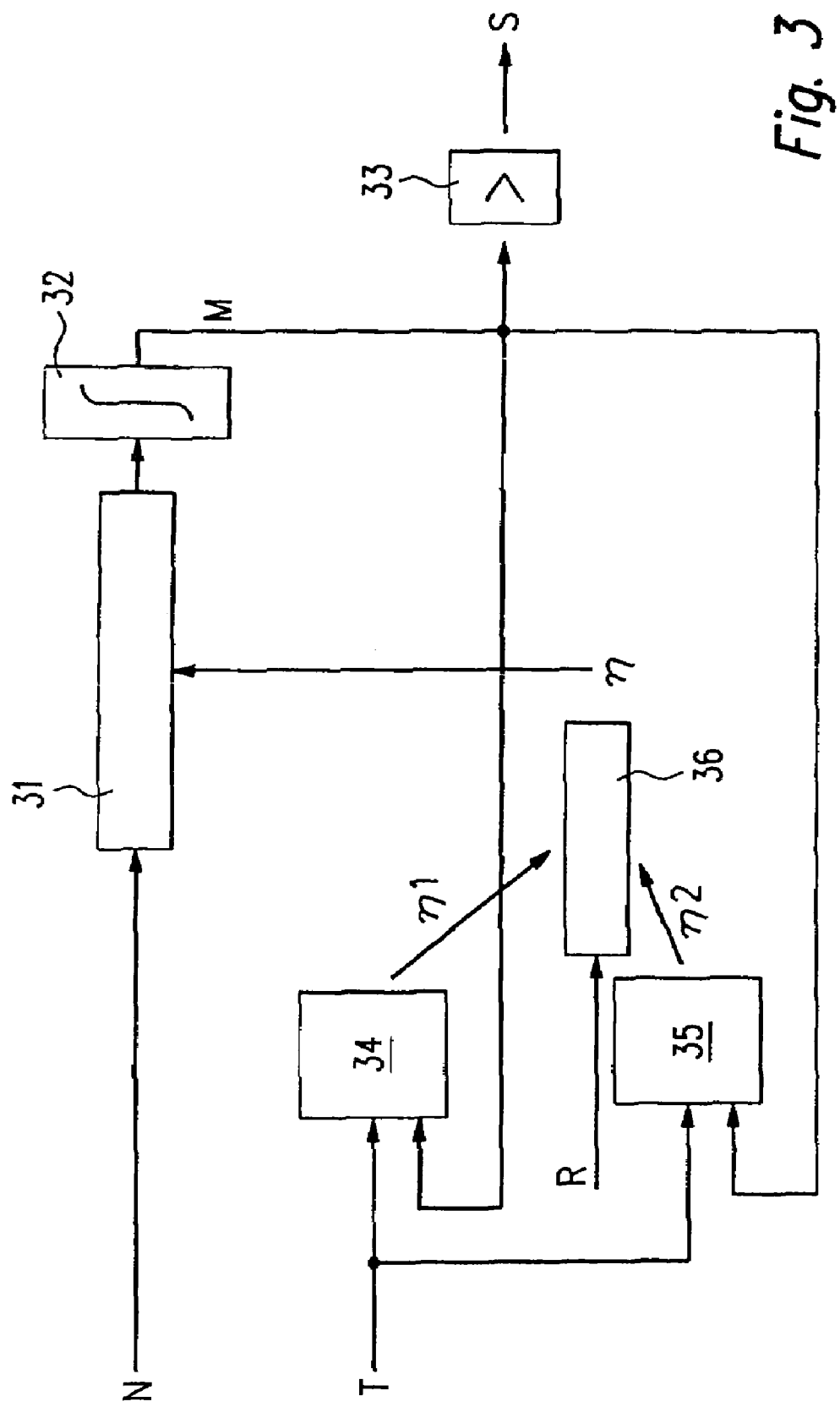
FIG. 3 shows a schematic flow chart of an exemplary embodiment of a method for operating the internal combustion engine of FIG. 1.

FIG. 3 shows a method for operating internal combustion engine 10. This method is carried out by a control device, which receives input signals from sensors, for example, temperature sensor 22, and generates output signals for actuators, such as for fuel injector 17 or spark plug 18, by which internal combustion engine 10 is able to be controlled. The control device is adapted in such a way that it is able to execute the method described in the following. To this end, the control device may be designed using analog circuit technology and/or as a digital processor having a memory. In the latter case, a computer program is provided, which is programmed such that the described method is implemented with the aid of the computer program. In this case, the mentioned characteristics maps of FIGS. 2a and 2b may be stored in the aforesaid memory.

According to FIG. 3, an untreated $NO_x$ mass N is fed to a block 31. The untreated $NO_x$ mass N is the mass of nitrogen oxides $NO_x$ emitted by internal combustion engine 10 and present in the exhaust-gas flow to accumulator-type catalytic converter 21. In FIG. 1, this untreated $NO_x$ mass N is indicated in conjunction with pipe 20. Untreated $NO_x$ mass N may be ascertained with the aid of sensors and/or model calculations from performance quantities of internal combustion engine 10.

According to FIG. 3, untreated $NO_x$ mass N is linked with an efficiency $\eta$. This will be explained in greater detail. The $NO_x$ mass obtained in this way is fed to a block 32, which represents an integrator. With the aid of this integrator 32, the $NO_x$ mass M already stored in accumulator-type catalytic converter 21 is ascertained. In so doing, it is assumed that, after a complete regeneration of accumulator-type catalytic converter 21, integrator 32 is reset to zero, to then carry out a new integration of untreated $NO_x$ mass N weighted by efficiency $\eta$. The $NO_x$ mass M stored in accumulator-type catalytic converter 21 is also indicated in FIG. 1.

In a following block 33, the $NO_x$ mass M is compared to a predefined threshold value. If $NO_x$ mass M exceeds this threshold value, a signal S is generated which is supplied to a regeneration control (not shown), that uses this information within the framework of a decision process with respect to initiating a regeneration of accumulator-type catalytic converter 21.

Moreover, the $NO_x$ mass M already temporarily stored in accumulator-type catalytic converter 21 is supplied to the two characteristics maps in FIGS. 2a and 2b. The characteristics map of FIG. 2a is represented in FIG. 3 as block 34, and the characteristics map of FIG. 2b is represented as block 35.

Temperature T of accumulator-type catalytic converter 21 is also supplied to both characteristics maps 34, 35. Temperature T may be ascertained with the aid of a model, if temperature sensor 22—as shown in FIG. 1—measures only the temperature of the exhaust-gas flow to accumulator-type catalytic converter 21. If temperature sensor 22 is allocated directly to accumulator-type catalytic converter 21, then temperature T may be further used immediately.

In each case an efficiency η1 and η2 are now read out from the two characteristics maps 34, 35 as a function of $NO_x$ mass M and temperature T. The two efficiencies η1, η2 are supplied to an interpolation, represented in FIG. 3 as block 36. The actual space velocity R currently existing in accumulator-type catalytic converter 21 is also supplied to this interpolation. This space velocity R may be ascertained, for example, from the exhaust-gas volumetric flow, which, on its part, may be measured with the aid of sensors and/or calculated with the aid of models and/or characteristics maps of other performance quantities of internal combustion engine 10.

The two efficiencies η1, η2 are thereupon linked as a function of space velocity R by interpolation 36 to form a storage efficiency η. Familiar interpolation methods may be used for this purpose. In the simplist case, from known space velocities R1, R2, which form the basis of both characteristics maps 34, 35, and from instantaneous space velocity R, a factor may be ascertained with which the two efficiencies η1, η2 enter into the calculation of storage efficiency η.

Achieved by interpolation 36 is that neither space velocity R, which forms the basis of characteristics map 34, nor space velocity R2, which forms the basis for characteristics map 35, is solely decisive in each instance, but rather that actual space velocity R in accumulator-type catalytic converter 21 is taken into account. Overall, therefore, storage efficiency η is a function of actual space velocity R of accumulator-type catalytic converter 21, as well as—via the two characteristics maps 34, 35—temperature T of accumulator-type catalytic converter 21 and the $NO_x$ mass M already stored therein.

As was already mentioned, storage efficiency η is linked with untreated $NO_x$ mass N in block 31. In the simplist case, this may be accomplished by multiplying untreated $NO_x$-mass N by storage efficiency η. In this case, block 31 is a multiplier. However, other linkages may also be provided and carried out with the aid of block 31.

Due to the linkage of untreated $NO_x$ mass N with storage efficiency η, it is not the entire untreated $NO_x$ mass N flowing into accumulator-type catalytic converter 21 which is considered as though it would be completely stored in accumulator-type catalytic converter 21, but rather only that portion of untreated $NO_x$ mass N is considered which accumulator-type catalytic converter 21 is presently able to store at all based on the instantaneous operating conditions.

FIG. 4 shows a supplementation of method which has been explained based on FIGS. 2a, 2b and 3. Corresponding features are denoted by corresponding reference numerals.

During operation of internal combustion engine 10 with a lean air/fuel mixture, not only nitrogen oxides $NO_x$ but also sulphur oxides, in particular sulphur dioxide $SO_2$, are formed. Accumulator-type catalytic converter 21 stores this sulphur dioxide $SO_2$ as well, so that accumulator-type catalytic converter 21 is also loaded to the extent that the loading is comparable to the loading of accumulator-type catalytic converter 21 with nitrogen oxides $NO_x$. As a result of the loading with sulphur dioxide $SO_2$, the storage capability, and therefore the storage efficiency η for the loading of accumulator-type catalytic converter 21 with nitrogen oxides $NO_x$ is reduced. One difference is that the loading with sulphur dioxide $SO_2$ takes place substantially more slowly than the loading with nitrogen oxides $NO_x$. Furthermore, regeneration of accumulator-type catalytic converter 21 is not possible under normal operating conditions, but rather requires an elevated temperature of accumulator-type catalytic converter 21.

FIG. 4 shows a block 37 which is provided for taking the loading of accumulator-type catalytic converter 21 with sulphur dioxide $SO_2$ into account. For that purpose, block 37 adds in how often accumulator-type catalytic converter 21 is regenerated by the regeneration control on the basis of signal S. With the aid of measurements which are carried out in advance on a reference accumulator-type catalytic converter of the same type, block 37 knows how much sulphur dioxide $SO_2$ is stored in the accumulator-type catalytic converter during a loading process of the accumulator-type catalytic converter with nitrogen oxides $NO_x$. Thus, block 37 is able to ascertain how much sulphur dioxide $SO_2$ is currently stored in accumulator-type catalytic converter 21. From this, block 37—again optionally with the aid of measurements carried out in advance on a reference accumulator-type catalytic converter—is able to derive a factor with which storage efficiency η must be influenced so that the storage capability of accumulator-type catalytic converter 21, reduced because of stored sulphur dioxide $SO_2$, is taken into account. This factor is then generated by block 37, to thereupon alter storage efficiency η accordingly.

Likewise, it is possible to ascertain the loading of accumulator-type catalytic converter 21 with sulphur dioxide $SO_2$ as a function of the total amount of burned fuel on the basis of the known content of sulphur dioxide $SO_2$ in the fuel. In this case, it may be assumed that approximately the total sulphur dioxide $SO_2$ is stored in accumulator-type catalytic converter 21. Plausibility analyses may be carried out in the event of changing fuel, and therefore changing content of sulphur dioxide $SO_2$. In this context, the loading of accumulator-type catalytic converter 21 must be carried out starting from the regeneration of the latter last implemented, with respect to sulphur dioxide $SO_2$. On this basis, it is then possible to again derive the factor, already mentioned, which thereupon alters storage efficiency η.

Quite generally, therefore, from the quantity of sulphur dioxide $SO_2$ already stored, determined in any way desired and optionally checked for plausibility, it is possible to infer the indicated factor, which ultimately then represents a deterioration of the storage efficiency of accumulator-type catalytic converter 21.

If the factor generated by block 37 reaches a predefined threshold value, then accumulator-type catalytic converter 21 may be regenerated with regard to sulphur dioxide $SO_2$. To that end, given, for instance, a rich air/fuel mixture, thus where Lambda<1, accumulator-type catalytic converter 21 is heated to an elevated temperature. Thereupon, the indicated factor may be reset to an initial value determined in advance.

In corresponding manner, as the storage of sulphur dioxide $SO_2$ in accumulator-type catalytic converter 21 can be taken into account by block 37, it is likewise possible to utilize block 37 for taking into account further changes in accumulator-type catalytic converter 21 dependent on the operating conditions. Thus, for example, a further factor may be provided, which takes into account the ageing over time and/or, e.g., damage to accumulator-type catalytic converter 21 caused by temperature, and which influences storage efficiency $\eta$ in corresponding manner.

What is claimed is:

1. A method for operating an internal combustion engine, comprising:

burning a lean air/fuel mixture in a combustion chamber;

storing a nitrogen oxide contained in an exhaust gas in a first accumulator-type catalytic converter;

ascertaining a first storage efficiency and a second storage efficiency with which the first accumulator-type catalytic converter stores the nitrogen oxide;

ascertaining the first storage efficiency and the second storage efficiency at least as a function of a temperature of the first accumulator-type catalytic converter, a great space velocity of the exhaust gas, and a small space velocity of the exhaust gas, wherein:

the first storage efficiency is ascertained for the great space velocity, and the second storage efficiency is ascertained for the small space velocity; and ascertaining an overall storage efficiency as a function of an instantaneous space velocity from the first storage efficiency and the second storage efficiency.

2. The method as recited in claim 1, further comprising:
   ascertaining the first storage efficiency and the second storage efficiency as a function of an $NO_x$ mass already stored in the accumulator-type catalytic converter.

3. The method as recited in claim 1, further comprising:
   interpolating the first storage efficiency and the second storage efficiency.

4. The method as recited in claim 1, wherein the overall storage efficiency is influenced by at least one of a storage of a sulphur oxide in the accumulator-type catalytic converter and an ageing of the accumulator-type catalytic converter.

5. The method as recited in claim 1, wherein the method is performed in a control device.

6. The method as recited in claim 1, wherein the method is performed in a control device contained in an internal combustion engine.

7. The method as recited in claim 1, further comprising:
   measuring in advance the first storage efficiency and the second storage efficiency on a reference accumulator-type catalytic converter of the same type as the first accumulator-type catalytic converter.

8. The method as recited in claim 7, further comprising:
   storing the first storage efficiency as a first characteristics map and the second storage efficiency as a second characteristics map.

9. A computer-readable medium having stored thereon instructions executable by a processor, the instructions which, when executed, cause the processor to perform steps that result in a performance of the following:

burning a lean air/fuel mixture in a combustion chamber;

storing a nitrogen oxide contained in an exhaust gas in a first accumulator-type catalytic converter;

ascertaining a first storage efficiency and a second storage efficiency with which the first accumulator-type catalytic converter stores the nitrogen oxide;

ascertaining the first storage efficiency and the second storage efficiency at least as a function of a temperature of the first accumulator-type catalytic converter, a great space velocity of the exhaust gas, and a small space velocity of the exhaust gas, wherein:

the first storage efficiency is ascertained for the great space velocity, and the second storage efficiency is ascertained for the small space velocity; and ascertaining an overall storage efficiency as a function of an instantaneous space velocity from the first storage efficiency and the second storage efficiency.

* * * * *